A. BROOKS.
GRAIN HEADING MACHINE.
APPLICATION FILED JUNE 23, 1915.
1,167,739.
Patented Jan. 11, 1916.
3 SHEETS—SHEET 1.
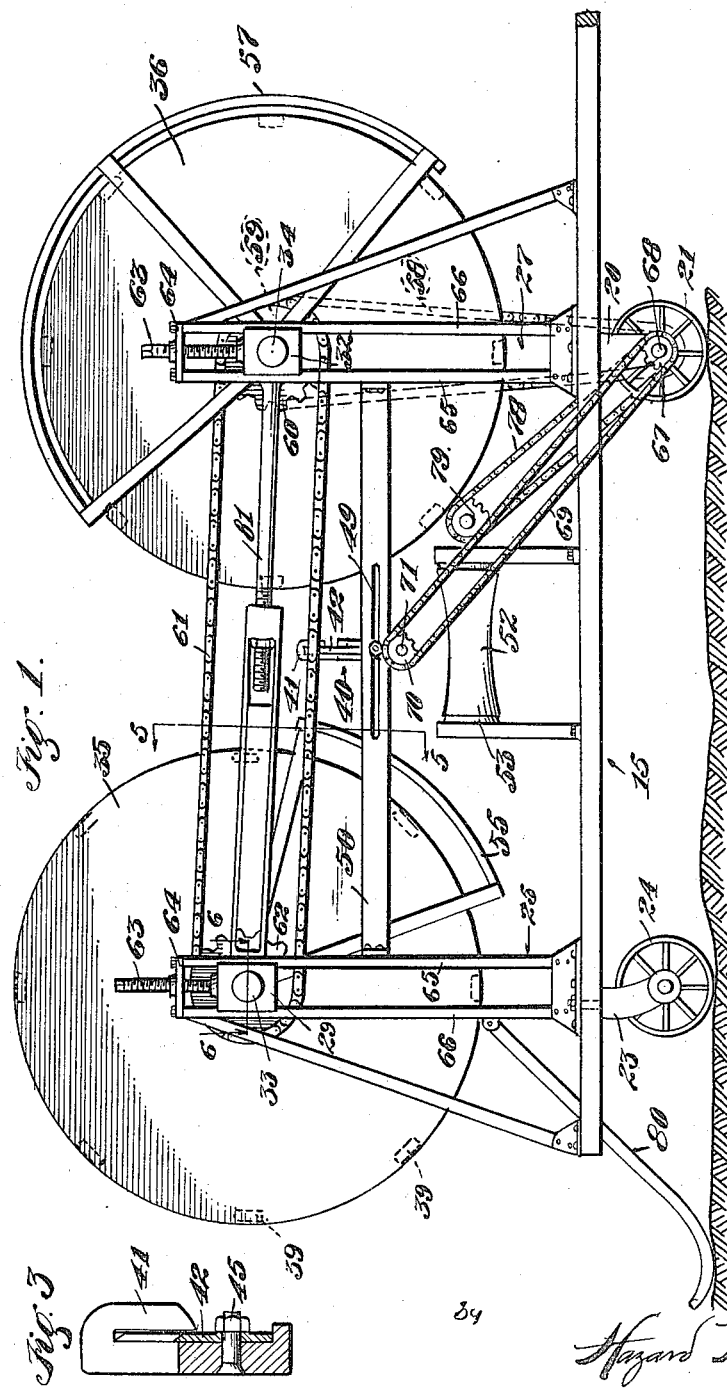
Inventor
Aubrey Brooks

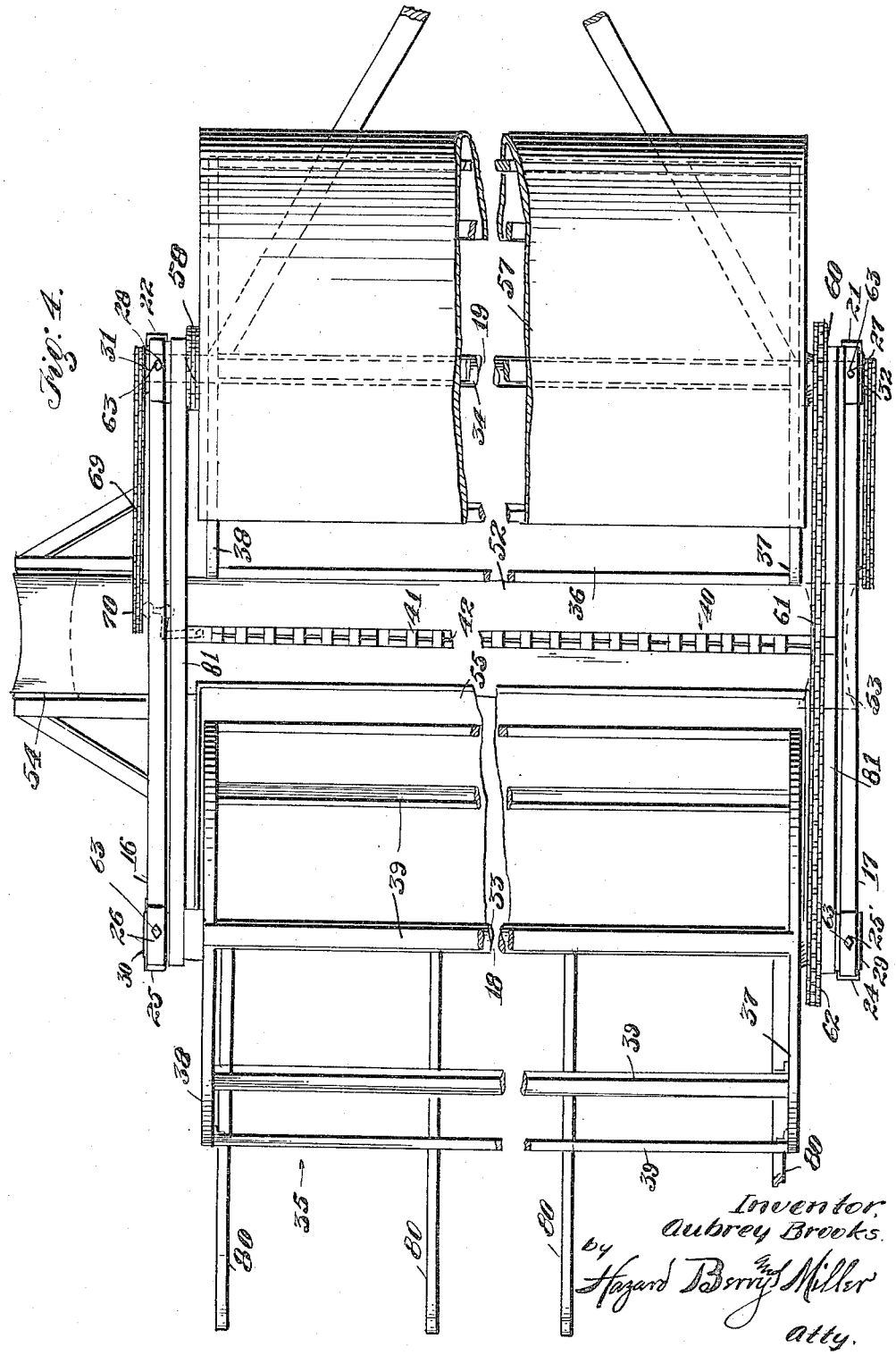

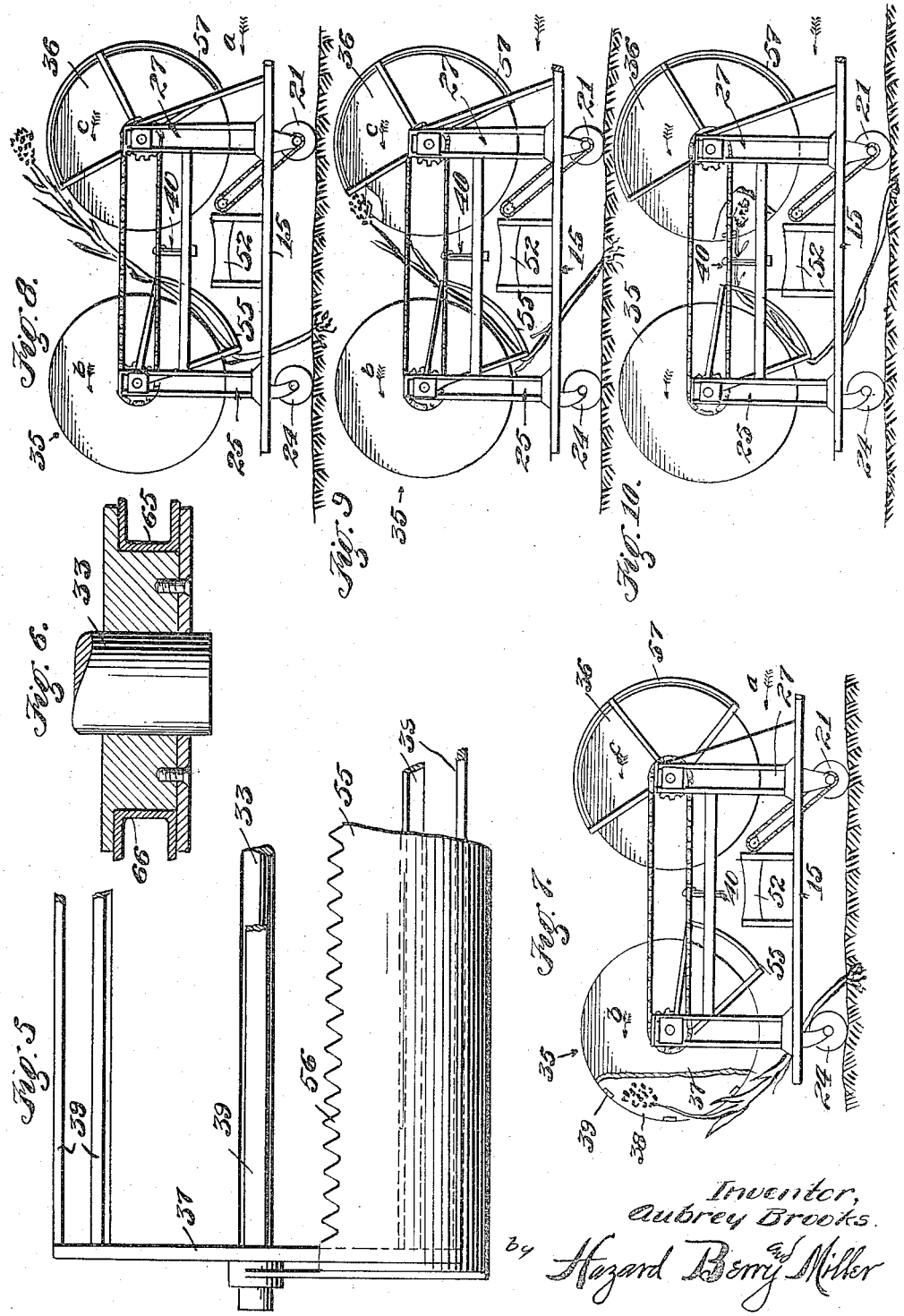

UNITED STATES PATENT OFFICE.

AUBREY BROOKS, OF HEBER, CALIFORNIA.

GRAIN-HEADING MACHINE.

1,167,739.   Specification of Letters Patent.   Patented Jan. 11, 1916.

Application filed June 23, 1915. Serial No. 35,756.

*To all whom it may concern:*

Be it known that I, AUBREY BROOKS, a citizen of the United States, residing at Heber, in the county of Imperial and State of California, have invented new and useful Improvements in Grain-Heading Machines, of which the following is a specification.

This invention relates to grain heading machines and more specifically to machinery for cutting the heads from milo maize, Kafir-corn and grains of like nature while the grain is standing in the field. Heretofore considerable difficulty has been encountered in mechanically harvesting this character of grain without severing the stalks remote from the heads, owing to its irregularity in height, and for this reason it has generally been found advisable to top these grains manually where it is desired to leave the stalks in the field.

It is an object of my invention to provide a machine that will cut the heads from grain of the above character at any predetermined distance from the head, regardless of variation in the length of the grain as it stands in the field.

A further object of my invention is to provide the machine with adjustable means whereby the length of stalk left on the head, when cut, can be selected.

Another object of my invention is to provide a grain heading machine that will not require any intricate mechanism to time or space the grain to accomplish the desired results, but which will depend upon the action of each individual stalk to determine the point at which the head will be severed.

A further object is to provide means for raising bent stalks as the machine advances, whereby they are fed thereto in a substantially upright position.

I obtain these objects by the mechanism illustrated in the accompanying drawings in which:

Figure 1 is a side elevation of my complete machine. Fig. 2 is a view in elevation of the cutter knife and the mechanism by which it is operated, parts being broken away. Fig. 3 is a sectional view of the cutter as seen on the line 3—3 of Fig. 2. Fig. 4 is a plan view of the machine. Fig. 5 is a fragmentary view of the forward drum as seen in the direction of arrows 5—5 in Fig. 1. Fig. 6 is an enlarged sectional view of a journal box as seen on the line 6—6 of Fig. 1. Figs. 7, 8, 9 and 10 are diagrammatic views in side elevation illustrating the operation of the machine.

More specifically, 15 is a rectangular frame upon which the operating mechanism of the machine is mounted and consists of the side members 16 and 17 and the cross members 18 and 19. The rear ends of the side members are carried upon brackets 20 which are rigidly secured to and depend from the side members and on which are mounted the wheels 21 and 22 which rest on the ground and form the rear portion of the running gear of the machine. Beneath the forward ends of the side members are dependent brackets 23 which are pivoted to turn horizontally and on which wheels 24 and 25 are mounted; the brackets 23 and wheels 24 and 25 forming the steering or forward portion of the running gear. Rigidly mounted on the frame 15 and extending upwardly and at right angles thereto are the ways 25, 26, 27 and 28 within which are slidably mounted the journal boxes 29, 30, 31 and 32 providing bearings for the rotating shafts 33 and 34 upon which are secured the primary feed drum 35 and the secondary feed drum 36; the drum 35 being arranged at the forward end of the frame and the drum 36 disposed near the rear end of the frame parallel with the forward drum and spaced therefrom. The drums 35 and 36 are of peculiar construction and are composed of circular end members 37 and 38 connected by horizontally extending slat members 39 spaced equidistant apart around the outer periphery of the heads 37 and 38.

Adjustably mounted between the drums 35 and 36 is a horizontally extending cutter mechanism 40 which may be of the construction commonly used on reapers of the ordinary type and is here shown as consisting of a sickle bar 41 within which is mounted a cutter blade 42, the teeth of which extend upwardly. Slots 43 and 44 are formed in the opposite ends of the cutter blade and serve as guides for the blade as it reciprocates upon stud bolts 45 and 46 which are secured within the end portions of the sickle bar 41. The sickle bar is formed on its outer ends with stud bolts 47 and 48 which project through slots 49 in parallel horizontally disposed bars 50 and 51 carried by the ways and to afford transverse adjustment for the blade so that its position relative to the drums may be varied. Disposed beneath the cutting mechanism and extending transversely of the machine is an endless belt conveyer which passes around pulleys 53 and 54; the pulley 54 being mounted at a distance from the main body of the machine making it possible for cut grain deposited on the belt to be carried away from the machine and delivered to a vehicle at the side thereof.

The forward drum 35 is partially inclosed by a shield 55 disposed rearwardly of the vertical center of the drum and extending concentric with its periphery and spaced therefrom to a point adjacent its horizontal center; thus shielding approximately a quarter of the drum in front of and below the cutting member. The shield 55 is preferably made of sheet metal and its upper edge is formed with serrations 56 which are for the purpose of separating the stalks of the grain which are passed thereon as later described. The rear drum 36 is partially inclosed with a rigidly mounted shield 57, which is arranged to extend over the upper and rearwardly half of the drum.

The drums 35 and 36 are designed to be rotated simultaneously in corresponding directions, preferably at like speeds, while the machine is being advanced, and at which time the cutter blade is reciprocated and the conveyer belt operated. Any suitable driving means may be employed for this purpose, but the power is here shown as transmitted to the various mechanisms by sprockets and chains which are driven from the rear wheels 21 and 22. One chain 58 extends to a sprocket 59 mounted on the shaft 34 and drives the drum 36. On the other end of shaft 34 is mounted sprocket 60 which drives chain 61 and which in turn rotates drum 35 by means of the sprocket 62 secured to shaft 33. Shafts 33 and 34 are slidably mounted in ways 25 and 27 and are adapted to be adjusted by means of screws 63 mounted in threaded openings in the cross member 64 secured to the ends of the uprights 65 and 66 between which the journal boxes are slidably fixed.

A distance rod 81 connects the two and prevents undue strain on the chain 61. The cutter mechanism is operated by means of a sprocket 67 secured to the axle 68 of wheel 21 and sprocket 70 connected by the sprocket chain 69. Sprocket 70 is mounted upon a stud shaft 71 the other end of which carries a miter gear 72 meshing with gear 73 which is rigidly secured to crank disk 74 carrying a wrist pin 75; a connecting rod 76 on the pin 77 connecting with the sliding cutter blade 42. The conveying belt is driven from the same source of power as the other mechanisms described and is rotated from a sprocket mounted on shaft 68 by a chain 78 passing over a sprocket 79 which drives the conveyer pulley 53 through suitable gearing.

In explaining the operation of my machine attention is directed particularly to Figs. 7, 8, 9 and 10 which are diagrams showing the manner in which the grain passes through the machine. The machine is advanced along rows of grain in the direction indicated by the arrows "a", guide members 80 on the forward end of the machine operating to raise stalks bent across the rows into near vertical positions. The drum 35 rotating in the direction indicated by the arrows "b" initially comes in contact with the grain which will extend up between the slats 39 as shown in Fig. 7 and as the drum rotates and the machine advances the slats will operate to carry the heads of the grain between the drum 35 and the shield 55 as shown in Fig. 8. The serrations 56 will then operate to separate the stalks of grain and facilitate the cutting of the stalk when it reaches the cutting knife, as presently described. As the machine further advances the stalk is thrown back and rests on the top of shield 57 where it remains until it is drawn forward, due to the advance of the machine and the fact that the stalk is held to the ground by its roots, until it falls from the shield 57 and is engaged by the slats on rotating drum 36 and becomes engaged between the slats 39 of that drum as it rotates in the direction of the arrow "c". The action of this drum is to draw the stalk down and across the cutting knife 42 where the head is severed from the stalk and falls upon the conveyer which carries it to the side of the machine for loading or may be allowed to fall on the ground. The remaining stalk is pulled out of the machine as it passes over and is left standing in the field practically unharmed by the handling of the machine.

The drums 35 and 36 are provided with vertical adjustment so that the machine will accommodate fields of grain of different heights and also to provide a means of regulating the length of the stalk left on the head when cut from the main stalk. This is determined by the time when the stalk will fall from the shield 57 into the drum 36 and by the time when a slat 39 will draw it across the cutting edge of the knife mechanism 40. It will now be seen that any height of grain may be headed in this machine and that any length of head portion may be cut.

What I claim is:

1. In a grain heading machine the combination of a pair of feed drums, a cutting member interposed between said drums, and means coöperating with the drums whereby the grain will be fed to the cutting member and head portions of the grain of substantially equal length cut from the stalks.

2. In a grain heading machine the combination of a pair of feed drums mounted parallel to each other and rotating simultaneously, a cutting knife interposed between the drums, shield members partially covering the outer faces of the drums and so positioned to coöperate with the feed drums in feeding the grain to the cutting knife as to sever head portions of the grain of substantially equal length.

3. In a grain heading machine the combination of primary and secondary horizontally disposed parallel feed drums, a shield partially encompassing and extending rearwardly and downwardly from the primary drum, a shield substantially encompassing the upper and rearward portion of the secondary drum, and a reciprocally moving cutter interposed between said primary and secondary drums.

4. In a grain heading machine the combination of primary drum and a secondary drum rotating in substantially the same horizontal plane, a sickle interposed between the drums, and means whereby the grain is thrown back of the primary drum and into the secondary drum, and means coöperating with the secondary drum whereby the grain will be drawn across the sickle at such a point on the stalk that the head portions cut therefrom will be of uniform length while the machine is advancing, regardless of the total length of the stalk.

5. In a grain heading machine, a carriage, a horizontal drum having spaced slats, revolubly mounted on the forward portion of the carriage, a shield extending across and spaced from the drum and projecting upwardly from a point near the lower portion of the drum toward the rear thereof, a horizontal cutter having vertically extending cutting blades arranged adjacent the upper end of the shield, means for rotating the drum to cause it to engage the tops of stalks as the carriage advances and carry them over the shield, and means for delivering the ends of the stalks to the cutter.

6. In a grain heading machine, a carriage, a horizontal drum having spaced slats, revolubly mounted on the forward portion of the carriage, a shield extending across and spaced from the drum and projecting upwardly from a point near the lower portion of the drum toward the rear thereof, a horizontal cutter having vertically extending cutting blades arranged adjacent the upper end of the shield, means for rotating the drum to cause it to engage the tops of stalks as the carriage advances and carry them over the shield, and means for delivering the ends of the stalks to the cutter, whereby the head portions of the stalks may be severed at approximately equal lengths.

7. In a grain heading machine, a carriage, a horizontal drum having spaced slats, revolubly mounted on the forward portion of the carriage, a shield extending across and spaced from the drum and projecting upwardly from a point near the lower portion of the drum toward the rear thereof, a horizontal cutter having vertically extending cutting blades arranged adjacent the upper end of the shield, means for rotating the drum to cause it to engage the tops of stalks as the carriage advances and carry them over the shield, means for delivering the ends of the stalks to the cutter, and means for separating the stalks as they are fed to the cutter.

8. In a grain heading machine, a carriage, a horizontal drum having spaced slats, revolubly mounted on the forward portion of the carriage, a shield extending across and spaced from the drum and projecting upwardly from a point near the lower portion of the drum toward the rear thereof, a horizontal cutter having vertically extending cutting blades arranged adjacent the upper end of the shield, means for rotating the drum to cause it to engage the tops of stalks as the carriage advances and carry them over the shield, means for delivering the ends of the stalks to the cutter, and serrations on the upper edge of the shield for separating the stalks as they are fed to the cutter.

9. In a grain heading machine, a carriage, a horizontal drum having spaced slats, revolubly mounted on the forward portion of the carriage, a shield extending across and spaced from the drum and projecting upwardly from a point near the lower portion of the drum toward the rear thereof, a horizontal cutter having vertically extending cutting blades arranged adjacent the upper end of the shield, means for rotating the drum to cause it to engage the tops of stalks as the carriage advances and carry them over the shield, means for delivering the ends of the stalks to the cutter, whereby the head portions of the stalks may be severed at approximately equal lengths, means for separating the stalks as they are fed to the cutter, and means for adjusting the feeding device whereby the length of the cut portion of the stalk may be varied.

10. A grain heading machine comprising a carriage, a pair of horizontally extending slatted drums adjustable vertically on said carriage, a shield extending beneath the forward drum having serrations on its upper edge, a horizontal cutter adjacent the upper edge of the shield, and a shield extending over the upper portion of the rear drum.

11. A grain heading machine comprising a carriage, a pair of horizontally extending slatted drums adjustable vertically on said carriage, a shield extending beneath the forward drum having serrations on its upper edge, a horizontal cutter adjacent the upper edge of the shield, a shield extending over the upper portion of the rear drum, and means for rotating the drums as the carriage advances whereby standing stalks may be fed to the cutter to sever the heads thereof.

12. A grain heading machine comprising a carriage, a pair of horizontally extending slatted drums adjustable vertically on said carriage, a shield extending beneath the forward drum having serrations on its upper edge, a horizontal cutter adjacent the upper edge of the shield, a shield extending over the upper portion of the rear drum, means for rotating the drums as the carriage advances whereby standing stalks may be fed to the cutter to sever the heads thereof, and a conveyer extending beneath the cutter to carry the severed heads to one side of the carriage.

In testimony whereof I have signed my name to this specification.

AUBREY BROOKS.

Copies of this patent may be obtained for five cents each, by addressing the "Commissioner of Patents. Washington, D. C."